United States Patent [19]
Ohta

[11] Patent Number: 4,459,598
[45] Date of Patent: Jul. 10, 1984

[54] IMAGE RECORDING METHOD

[75] Inventor: Wasaburo Ohta, Yokohama, Japan

[73] Assignee: Ricoh Company, Ltd., Japan

[21] Appl. No.: 305,196

[22] Filed: Sep. 24, 1981

[30] Foreign Application Priority Data

| Sep. 24, 1980 | [JP] | Japan | 55-132683 |
| Mar. 23, 1981 | [JP] | Japan | 56-41862 |
| Mar. 23, 1981 | [JP] | Japan | 56-41863 |
| Apr. 7, 1981 | [JP] | Japan | 56-52159 |

[51] Int. Cl.$^3$ .................................... G01D 15/12
[52] U.S. Cl. ................................. 346/74.2; 430/39
[58] Field of Search ............ 346/74.2, 74.4, 74.5; 358/301; 430/39; 101/DIG. 5

[56] References Cited

U.S. PATENT DOCUMENTS

| 3,195,143 | 7/1965 | Jones, Jr. | 346/74.2 |
| 4,138,702 | 2/1979 | Magnenet | 360/125 |

OTHER PUBLICATIONS

Cole, "High-Speed Magnetic Printer", IBM Technical Disclosure Bulletin, vol. 15, No. 11, Apr. 1973, p. 3466.
Dreyfus et al., "Channel for Printing With Magnetic Mist", IBM Technical Disclosure Bulletin, vol. 21, No. 12, May 1979, pp. 5060-5061.

Primary Examiner—Thomas H. Tarcza
Attorney, Agent, or Firm—Guy W. Shoup; Gerard F. Dunne

[57] ABSTRACT

A method of image recording, including the steps of superposing a nonmagnetic sheet over a magnetic recording member, forming a magnetic latent image on the magnetic recording member either directly or through the nonmagnetic sheet by perpendicular magnetization before or after the nonmagnetic sheet is superposed over the magnetic recording member, developing the magnetic latent image with a magnetic toner from above the nonmagnetic sheet superposed over the magnetic recording member, to produce a toner image on the nonmagnetic sheet, fixing the toner image on the nonmagnetic sheet superposed on the magnetic recording member and separating the nonmagnetic sheet from the magnetic recording member following the fixing step.

20 Claims, 12 Drawing Figures

IMAGE RECORDING METHOD

BACKGROUND OF THE INVENTION

This invention relates to image recording methods, and more particularly it is concerned with a method of image recording information on a nonmagnetic sheet such as paper by using a magnetic recording member.

Heretofore, an image recording method is known in which a laser, particularly a semiconductor laser of compact size, is used to scan a photosensitive member that is charged beforehand, to form an electrostatic latent image thereon which is then developed into visible images to produce a duplicate of the document. As is well known, the electrophotographic process contains the steps of charging, exposing, developing and transfer-printing, and the surface of the photosensitive member is uniformly charged at a predetermined polarity. Upon the charged photosensitive member being exposed to an optical image of the documents to be copied, the charged photosensitive member is selectively discharged depending on the brightness of the optical image, to form an electrostatic latent image corresponding to the document. Meanwhile in a recording method using a laser, exposing of the charged photosensitive member by an optical image of the original is replaced by scanning for writing information to the photosensitive member carried out with a laser beam which is modulated by image signals produced by a solid state image sensor as a result of scanning. Such recording method raises the problem that difficulties are encountered in carrying out recording at high speed due to limitations placed by the spectral sensitivity of the photosensitive member because the light beam emitted by the laser has a wavelength in the range between 600 and 900 nm in the vicinity of visible rays. The image signals produced as a result of scanning to read out information by means of the solid state image sensor have their power varied depending on the image regions (dark regions) of the document. Thus the electrostatic latent image produced by scanning carried out with the laser beam to write information to the photosensitive member is a negative latent image having a low potential in portions of the photosensitive member corresponding to the image regions (dark regions) of the document, and it is necessary to carry out developing in the form of an inverse developing to develop such negative latent image into a positive image. This makes it impossible to use a developing agent that is commonly used in the ordinary electrophotographic printing process.

In another image recording method known in the art using a laser, the laser functions as a heat source. In this method, a heat sensitive sheet is used which has a coating of a chemical that develops color upon being heated. This recording method makes it impossible to use ordinary plain paper as copy sheets, thereby increasing running cost and rendering the recording sheets conspicuous by their unusualness.

In still another image recording method known in the art, a magnetic latent image is formed either by magnetizing a magnetic recording member by magnetic signals corresponding to information that is to be recorded (printed) or by scanning a uniformly magnetized magnetic recording member with a laser beam modulated by the signals to form a magnetic latent image. Such magnetic latent image is then developed by using a magnetic toner to produce a toner image which is printed by transfer-printing on a nonmagnetic sheet and fixed to produce a recorded (printed) sheet.

In the conventional image recording methods referred to hereinabove, the magnetic recording member is repeatedly used by directly developing the magnetic latent image formed on the magnetic recording member. The methods suffer the following disadvantages:

(1) It is necessary to carry out cleaning of the magnetic recording member each time printing is carried out, to remove the residual magnetic toner therefrom, and cleaning renders the recording apparatus complex in construction.

(2) Even if cleaning is carried out each time printing is performed, it would be difficult to remove all the residual toner from the magnetic recording member, and the residual toner might contaminate the nonmagnetic sheet in the following transfer-printing operation.

(3) A developing station, a cleaning station and in some cases a magnetic recording head might be brought into direct contact with the magnetic recording member, and this might shorten the service life of the magnetic recording member due to wear caused on its surface and deterioration thereof.

(4) It is necessary to erase the residual magnetic latent image on the magnetic recording member following transfer-printing of the visible image, each time printing is carried out. This makes it necessary to use a demagnetizing device which renders the printing apparatus complex in construction. Particularly when a demagnetizing head is used as an erasing device, the demagnetizing head and the magnetic recording member suffer wear and deterioration because they are directly brought into contact with each other, thereby shortening the service lives thereof and making it difficult to perform high speed printing.

SUMMARY OF THE INVENTION

This invention has been developed for the purpose of obviating the aforesaid disadvantages of the prior art. Accordingly the invention has as its object the provision of an image recording method enabling the apparatus for carrying the method into practice to have a prolonged service life and capable of operating at high speed which can be carried into practice by using an apparatus of a simple construction without contaminating the apparatus with a magnetic toner as a result of scattering thereof.

The aforesaid object is accomplished according to the invention by an image recording method comprising the steps of superposing a nonmagnetic sheet over a magnetic recording member; forming a magnetic latent image on the magnetic recording member either directly or through the nonmagnetic sheet by perpendicular magnetization before or after the nonmagnetic sheet is superposed over the magnetic recording member; developing the magnetic latent image with a magnetic toner from above the nonmagnetic sheet superposed over the magnetic recording member, to produce a toner image on the nonmagnetic sheet; fixing the toner image on the nonmagnetic sheet superposed on the magnetic recording member; and separating the nonmagnetic sheet from the magnetic recording member following the fixing step.

DESCRIPTION OF THE PREFERRED EMBODIMENTS

Figure 1:
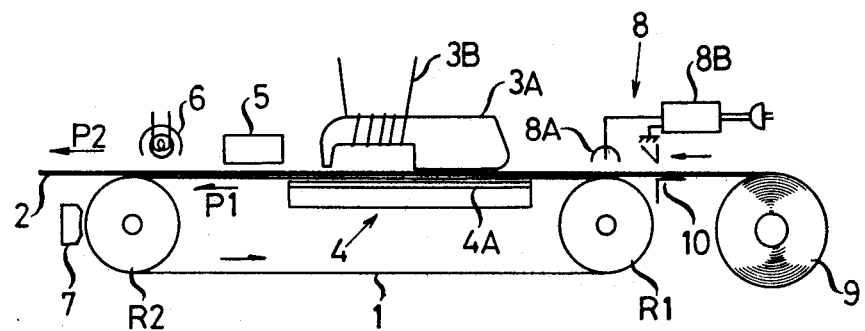
FIG. 1 is a schematic view of an apparatus suitable for carrying into practice a first embodiment of the invention for forming a latent image from above a sheet, developing the latent image from above the sheet and fixing the developed image from above the sheet.

Preferred embodiments of the invention will now be described by referring to the drawings in which parts similar to one another in function are designated by like reference characters.

FIG. 1 shows in a schematic view an apparatus suitable for carrying into practice one embodiment of the invention. As shown, the numeral 1 designates a magnetic recording member in the form of a belt trained over rollers R1 and R2 and driven by drive means, not shown, to travel in the direction of an arrow P1. The recording member 1 is composed of a flexible support 1A (FIG. 2) of polyester resin, vinyl chloride resin, synthetic rubber, fluorine resin or other plastics in sheet form or stainless steel or other metal in sheet form, and a magnetic recording layer 1B (FIG. 2) formed on the support 1A of magnetic material exhibiting perpendicular magnetization characteristics.

The magnetic material exhibiting the perpendicular magnetization characteristics may be selected from the group consisting of $FeO_2$, $Fe_2O_3$, $Fe_3O_4$, $CrO_2$, Fe-Ni.Co alloy, $MnBi$, $Mn.Al.Ge$ alloy, $Y_3.Ga_{1-1}.Fe_{3-9}.O_{12}$, $Tb.FeO_3$, $GdI.G$, $C_0P$, $Sm_{0-7}.Er_{0-3}.FeO_3$, $GdFe$ and $TbFe$.

The magnetic recording layer 1B may be formed on the support 1A by mixing one of the magnetic materials in powder form with a synthetic resinous binder and kneading the mixture into a paint form which is applied to the surface of the support 1A and dried, to provide the magnetic recording layer 1B. Also, one of the magnetic materials may be directly deposited on the support 1A as the magnetic recording layer by vacuum evapolation sputtering, a molecular beam epitaxy process, a liquid phase epitaxy process, etc. When it suits the magnetic material, a chemical vapor deposition process may be used.

In a perpendicular magnetization system a magnetic latent image is formed by selective polarization of portions of the magnetic recording layer 1B in the direction of its thickness (perpendicular direction) in accordance with signals to be stored, and an external magnetic field due to the magnetized portion of the layer 1B has a configuration rising very sharply. For example, when a small dot region of a square as seen above the magnetic recording layer 1B is magnetized, the external magnetic field formed by the magnetized dots is distributed in the form of a four cournered pillar, so that the distribution of the magnetic field extending in a plane parallel to the magnetic recording layer 1B is still in the form of a square even if this plane is spaced apart from the surface of the magnetic recording layer 1B. Thus when a sheet of nonmagnetic material is superposed over the magnetic recording layer 1B, the external magnetic field appearing on the surface of the sheet of nonmagnetic material has a distribution in a plane which is not much different in planar contour from the distribution in a plane of the external magnetic field on the magnetic recording layer 1B.

Therefore, by developing the magnetic latent image formed on the recording member 1 by means of a magnetic toner from above the sheet while superposing a sheet of nonmagnetic material over the magnetic recording member 1, it is possible to produce a clearly developed image on the sheet. Since the external magnetic field generated by perpendicular magnetization rises sharply, the developed image has a high resolution, and it is possible to store data at high density.

When it is desired to bring a sheet of nonmagnetic material into intimate contact with the magnetic recording member 1 by the electrostatic force due to the charge applied by using corona discharge subsequently to be described, the magnetic recording member 1 may advantageously be grounded. That is, when a material of relatively low electric resistance or a material having a volume resistivity of below about $10^8 \Omega$ cm from the magnetic materials of perpendicular magnetization characteristics referred to hereinabove is used for forming the magnetic recording layer 1B, the magnetic recording layer 1B should be grounded. When the magnetic material has a higher volume resistivity, a conductive material layer is formed on the flexible support 1A, and the magnetic recording layer 1B is formed on the conductive material layer which is grounded.

The numeral 2 designates a sheet of nonmagnetic material in web form which is fed from a sheet supply section 9 and moved in the direction of an arrow $P_2$ after being placed on the magnetic recording member 1. The web is cut by a cutter 10 into a sheet of desired size. The sheet 2 may be either paper, plastics, nonmagnetic metal, etc., so long as the sheet 2 is nonmagnetic. When a contacting device utilizing the electrostatic force produced by charging by means of corona discharge subsequently to be described is used, the sheet 2 is preferably formed of a material having a volume resistivity of over $10^{10}$ Ω cm to make charging possible.

Figure 2:
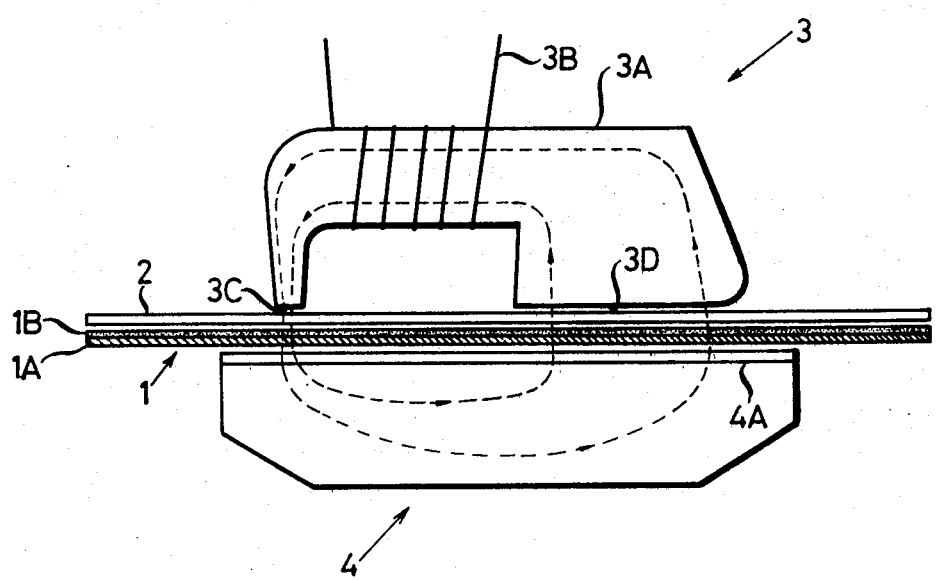
FIG. 2 is a schematic view of the magnetic recording station of the apparatus shown in FIG. 1.

FIG. 2 shows one example of the magnetic recording station for subjecting the magnetic recording layer 1B of the magnetic recording member 1 to perpendicular magnetization in accordance with signals to be stored. In FIGS. 1 and 2, the magnetic recording station 3 is provided with a plurality of magnetic recording heads each comprising a magnetic core 3A of a small thickness formed by stamping in a predetermined shape, and a magnetizing coil 3B wound around the core 3A. The magnetic recording heads 3 which are equal in number to the record dots necessary for forming an image are arranged close to one another over the sheet 2 widthwise thereof. Each magnetic core 3A has a recording pole 3C having a forward end of a surface area which may vary depending on the size of the pattern of the information to be recorded or which is square in the range between 0.1 and 0.01 mm. The magnetic core 3A also has a flux-closing pole 3D having a surface juxtaposed against the nonmagnetic sheet 2 which has a far greater surface area than the recording pole 3C. Thus the magnetic flux traversing the flux-closing pole 3D has its density reduced, so that magnetization of the magnetic recording layer 1B of the magnetic recording member 1 can be minimized when it passes below the flux-closing pole 3D.

The numeral 4 designates a magnetic shunt formed of a magnetic material which is juxtaposed against the magnetic core 3A through the nonmagnetic sheet 2. The magnetic shunt 4 includes a nonmagnetic layer 4A which is a magnetic flux deflecting layer for bringing to a perpendicular in the magnetic recording layer 1B of the magnetic recording member 1 a magnetic flux which is generated between the magnetic core 3A and the magnetic shunt 4 by an electric signal supplied to the magnetization coil 3B.

The numeral 5 designates a developing station, in which a dry developing process of a magnet-brush system, cascade system, powder-cloud system, etc., may be used as desired. The developing toner used in the dry developing process includes powder of a magnetic material, such as $CrO_2$, $Fe_2O_3$, $Fe_3O_4$. The magnetic toner of a desired particle size may be obtained by mixing a toner of 0.1 to 10 μm with a synthetic resinous material, such as acrylic resin, vinyl resin, etc., in a suitable solvent, such as toluene, methyl ethyl ketone, ethyl acetate, etc., and kneading the mixture before being changed into powder by centrifugal drying.

The numeral 6 designates a fixing station in which fixing of the toner image is carried out by the usual process. The numeral 7 designates a demagnetizing head for demagnetizing the magnetic latent image formed on the magnetic recording layer 1B of the magnetic recording member 1, and the numeral 8 is a intimate contacting device which comprises a corona charger 8A and a high voltage power pack 8B for impressing voltage to the corona charger 8A, and serves for bringing the magnetic recording layer 1B of the magnetic recording member 1 into intimate contact with the nonmagnetic sheet 2 by the electrostatic force brought about by corona discharge. It is to be understood that the invention is not limited to the contacting device 8 of the aforesaid construction and that any other device may be used that brings the magnetic recording layer 1B of the magnetic recording member 1 into intimate contact with the nonmagnetic sheet 2.

Operation of the apparatus shown in FIG. 1 will now be described. As the magnetic recording member 1 is moved by drive means, not shown, the nonmagnetic sheet 2 is placed on the magnetic recording layer 1B of the member 1 and brought into intimate contact therewith by the contacting device 8. The nonmagnetic web is payed out of the feeding section 9 and cut by the cutter 10 into the sheet 2 of the predetermined size before being placed on the magnetic recording layer 1B. The nonmagnetic sheet 2 in intimate contact with the magnetic recording layer 1B of the magnetic recording member 1 passes between the magnetic recording heads 3 and the magnetic shunt 4. At this time, a current is passed to the magnetizing coil 3B of the magnetic head 3 and a closed magnetic field is produced between the magnetic core 3A and the magnetic shunt 4 as indicated by dotted lines in FIG. 2, to magnetize the magnetic recording layer 1B of the magnetic recording member 1. When no current is passed to the magnetizing coil 3B, the magnetic field indicated by the dotted lines is not produced and the magnetic recording layer 1B of the magnetic recording member 1 is not magnetized. By effecting control of passing a current to the magnetizing coil 3B or not in accordance with signals corresponding to the information to be recorded, it is possible to record a magnetic latent image of the information on the magnetic recording layer 1B of the magnetic recording member 1 through the nonmagnetic sheet 2 interposed between the magnetic recording layer 1B and the magnetic head 3.

FIG. 1 shows the apparatus suitable for carrying into practice one embodiment of the invention as seen from one side thereof. Actually, a plurality of magnetic recording heads 3 are arranged widthwise of the magnetic recording member 1 and the nonmagnetic sheet 2. Thus the signals are passed successively to the magnetizing coils 3B in synchronism with the travel of the magnetic recording member 1 and the nonmagnetic recording sheet 2. Thus the plurality of magnetic recording heads 3 may be located at a predetermined angle with respect to the direction of travel of the magnetic recording member 1 which is commensurate with the velocity of movement of the magnetic recording member 1 or the nonmagnetic sheet 2 and the time interval at which the signal is successively passed to the magnetizing coils 3B of the heads 3.

The magnetic recording member 1 having the magnetic latent image formed on the magnetic recording layer 1B and the nonmagnetic sheet 2 placed on the recording member 1 reach the developing station 5 where the magnetic latent image on the magnetic recording layer 1B of the magnetic recording member 1 is developed from above the nonmagnetic sheet 2 with a magnetic toner. That is, a toner image of the latent image is formed on the nonmagnetic sheet 2. After having the toner image fixed on the nonmagnetic sheet 2 at the fixing station 6, the nonmagnetic sheet 2 is separated from the magnetic recording layer 1B of the magnetic recording member 1. Upon the nonmagnetic sheet 2 being separated from the member 1, the magnetic latent image recorded on the magnetic recording layer 1B of the magnetic recording member 1 is erased by the demagnetizing head 7 located in the vicinity of the roller R2 to restore the recording member 1 to its original condition. The aforesaid steps are repeated successively to print information dots. By rendering the demagnetizing head 7 for a predetermined time or moving it away from the developing station 5 so as not to demagnetize the magnetic recording layer 1B to erase the magnetic latent image, it is possible to print the information on as many sheets as possible.

The contacting device 8 is not essential and may be dispensed with if there is no risk of the sheet 2 being displaced from the recording member 1 as when the nonmagnetic sheet 2 is highly adhesive.

In the present invention, no image on the magnetic recording layer is directly developed nor is any toner applied directly to the magnetic recording member, so that the need to clean the magnetic recording member 1 to remove the residual toner therefrom each time the image is printed can be eliminated. Thus no wear is caused on the magnetic recording layer 1B so that it shows no deterioration after a prolonged use. The nonmagnetic sheet, such as a printing paper, is separated from the magnetic recording layer 1B of the magnetic recording member 1 after the toner image formed thereon is fixed, so that there is no risk of the magnetic toner being scattered or moving when the sheet is separated. This eliminates contamination of the nonmagnetic sheet and the apparatus with toner, enabling a fresh, clear-cut image to be produced at all times.

Figure 3:
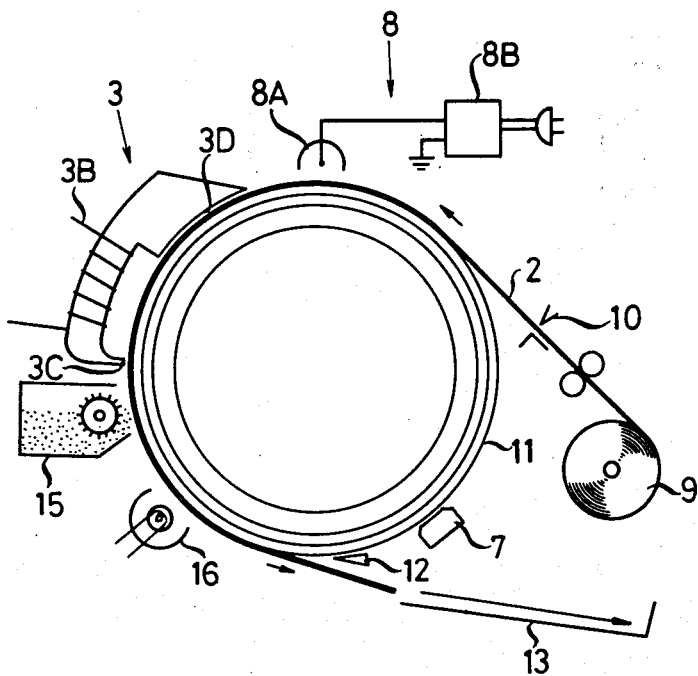
FIG. 3 is a schematic view of a modification of the apparatus shown in FIG. 1.

FIG. 3 is a schematic view of an apparatus incorporating therein a modification of the apparatus shown in FIG. 1. In the apparatus shown in FIG. 3, the magnetic recording member 1 shown in FIG. 1 is constructed in the form of a drum and the magnetic shunt 4 is correspondingly constructed in the form of a drum, to enable the magnetic recording member 1 and hence the magnetic recording layer 1B to rotate.

Figure 4:
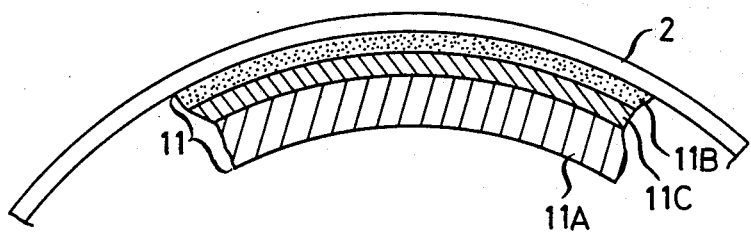
FIG. 4 is a view, on an enlarged scale, showing the magnetic recording member and the nonmagnetic sheet in contact with each other in the apparatus shown in FIG. 3.

FIG. 4 shows, on an enlarged scale, portions of the magnetic recording drum 11 and the nonmagnetic sheet 2 of the apparatus shown in FIG. 3. In FIG. 4, the magnetic recording drum 11 has a nonmagnetic material layer 11C on a magnetic support 11A, and a thin magnetic material layer 11B on the nonmagnetic material layer 11C. The nonmagnetic material layer 11C is preferably formed of material conducting no heat, such as metal oxides, $Al_2O_3$, $SiO_2$, ZnO, a urea or urethane base resin of high resistance to heat, or a polymer thereof with a vinyl base resin. The support 11A performs the function of the magnetic shunt 4 and the nonmagnetic material layer 11C plays the same role as the layer 4A. The magnetic recording drum 11 of the aforesaid construction enables an image of high resolution to be produced because the magnetic field in the thin magnetic material layer 11B can have good perpendicularity by virtue of the magnetic flux refracting action of the nonmagnetic material layer 11C. Also, the magnetic field under the recording pole 3C of the recording head has increased intensity and the external magnetic field generated by magnetization has also increased intensity and produced sharply.

Figure 5:
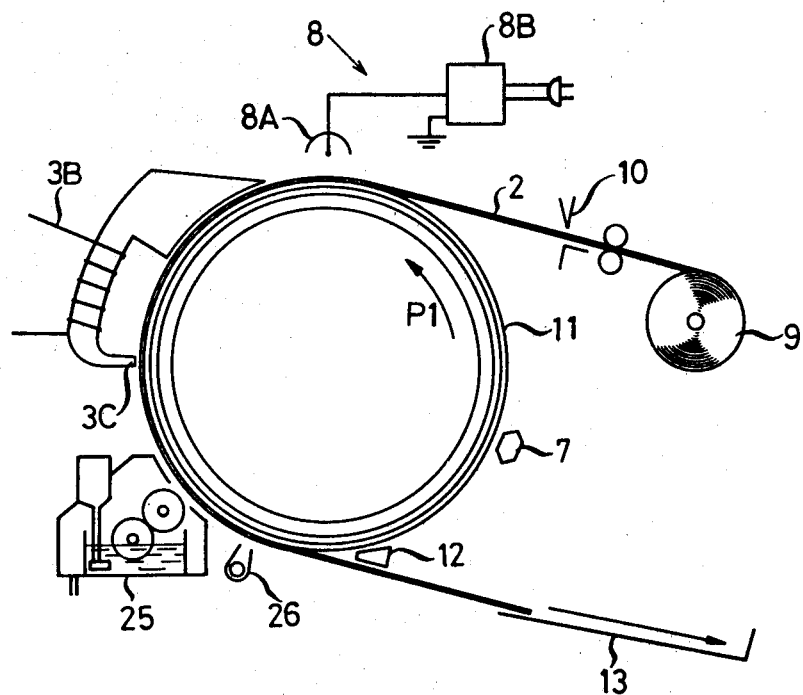
FIG. 5 is a schematic view of another modification of the apparatus shown in FIG. 1.

FIG. 5 shows a modification of the apparatus shown in FIG. 3. In the apparatus shown in FIG. 5, a dry developing device 15 and a thermal fixing device 16 of the apparatus shown in FIG. 3 are replaced by a liquid developing device 25 and a forced hot blast fixing device 26.

In FIGS. 3 and 5, the nonmagnetic sheet 2 is in contact with the outer periphery of the magnetic recording drum 11 substantially in the form of a letter U in a lying position, and the contacting device 8, magnetic recording heads 3, developing device 15, 25 and fixing device 16, 26 are located adjacent the region of the outer periphery of the magnetic recording drum at which the nonmagnetic sheet 2 is in contact with the drum. The apparatus shown in FIGS. 3 and 5 operate in the same manner as described by referring to FIG. 1. As the drum rotates in the direction of the arrow P1, formation of a magnetic latent image, developing of the magnetic latent image and fixing of the toner image are carried out from above the sheet 2 in the indicated order. Then the sheet 2 is separated from the drum by separating means 12 and delivered to a tray 13.

Figure 6:
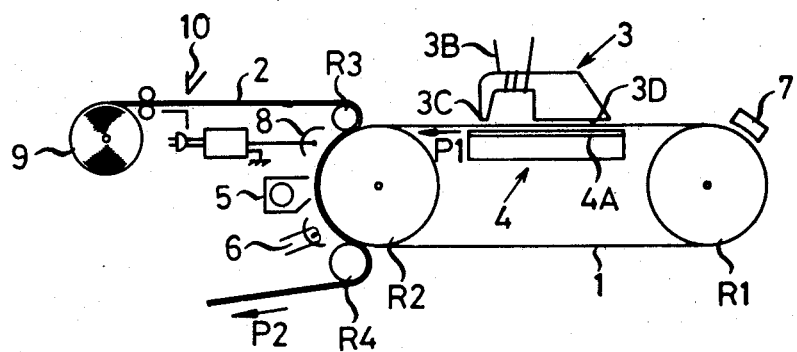
FIG. 6 is a schematic view of an apparatus suitable for carrying into practice a second embodiment of the method in conformity with the invention, in which formation of a latent image is not performed from above the sheet and only developing and fixing are performed from above the sheet.

FIG. 6 shows in a schematic view an apparatus suitable for carrying into practice a second embodiment of the invention. In the apparatus shown in FIGS. 1, 3 and 5, not only developing of a magnetic latent image and fixing of a toner image but also forming of a magnetic latent image is carried out from above the nonmagnetic sheet 2. However, developing and fixing have only to be carried out from above the nonmagnetic sheet 2 for the purpose of preventing the magnetic recording member 1, 11 from coming into contact with the magnetic toner and being contaminated thereby and preventing scattering or movement of the magnetic toner when the sheet is separated from the magnetic recording member. In the apparatus shown in FIG. 6, the nonmagnetic sheet 2 payed out of the supply section 9 is in contact with the magnetic recording member 1 only in the vicinity of the roller R2, and the magnetic recording heads 3 are located upstream of the contacting point of the sheet 2 with the recording member 1 with respect to the direction of movement of the recording member. Thus the nonmagnetic sheet 2 is superposed over the recording member 1 after a magnetic latent image is directly formed on the outer periphery thereof by the magnetic recording heads 3. In this respect, the apparatus shown in FIG. 6 is distinct from the apparatus shown in FIGS. 1, 3 and 5 in which the magnetic latent image is formed after the nonmagnetic sheet 2 is superposed over the magnetic recording member 1, 11. In the apparatus shown in FIG. 6, the nonmagnetic sheet 2 is in contact with the magnetic recording member on the outer periphery of the roller R2 and separated from the outer periphery of the roller R2 by using two guide rollers R3 and R4, and the contacting device 8, developing device 5 and fixing device 6 are located adjacent the region of the recording roller R2 at which the nonmagnetic sheet 2 is contact with the magnetic recording member 1.

Figure 7:
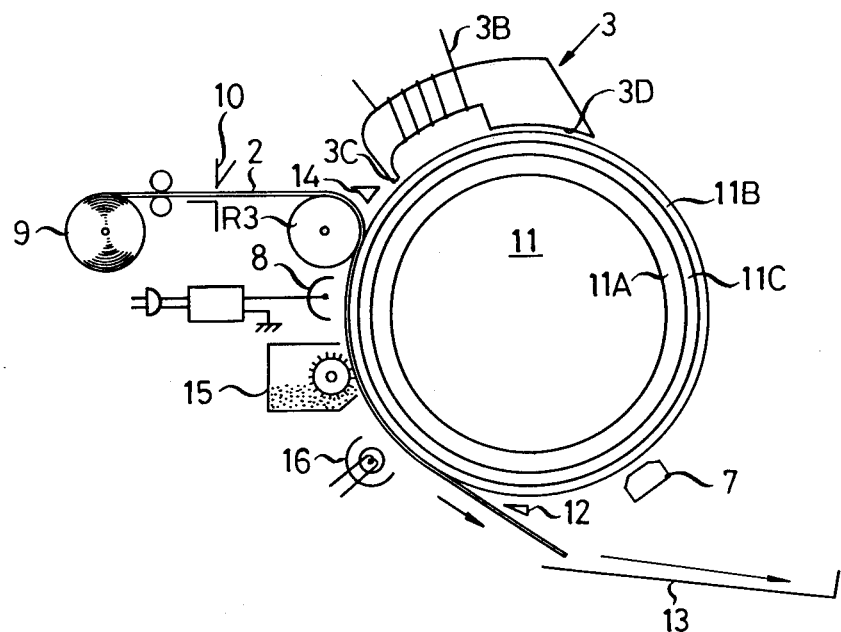
FIG. 7 is a schematic view of a modification of the apparatus shown in FIG. 6.

FIG. 7 is a schematic view showing a modification of the apparatus shown in FIG. 6, in which the recording member 1 shown in FIG. 6 is in the form of a magnetic recording drum and the magnetic shunt 4 is also in drum form, to enable the magnetic recording layer of the magnetic recording drum to rotate. The nonmagnetic sheet 2 payed out of the supply section 9 is trained over the guide roller R3 cooperating with a guide plate 14 and brought into contact with the outer periphery of the magnetic recording drum 11 at a point at which the outer periphery starts to rotate downwardly, before being separated from the outer periphery of the drum 11 by the separating means 12 located below the drum 11.

Figure 8:
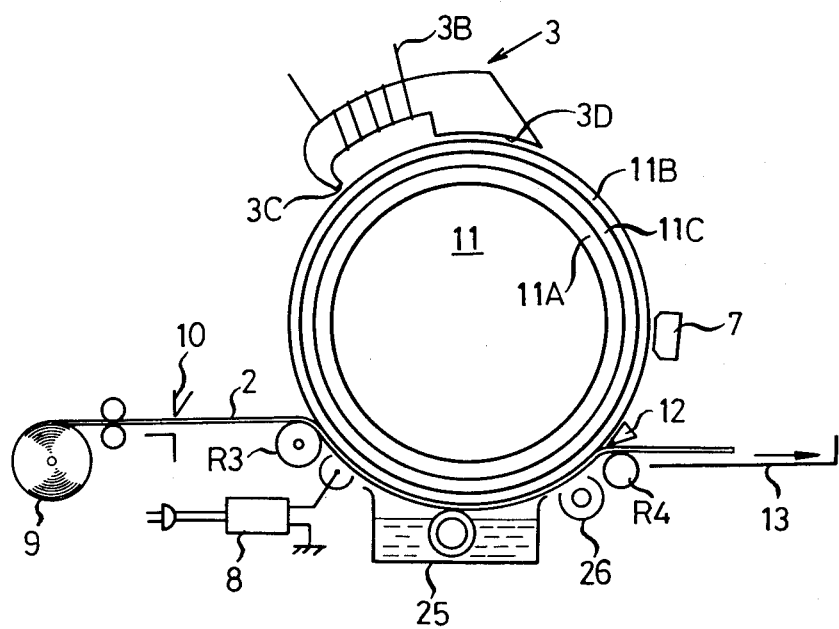
FIG. 8 is a schematic view of another modification of the apparatus shown in FIG. 6.

FIG. 8 shows a modification of the apparatus shown in FIG. 7, in which the dry developing device 15 and the fixing device 16 shown in FIG. 7 are replaced by a liquid developing device 25 and a forced hot blast fixing device 26. In this apparatus, the nonmagnetic sheet 2 is brought into the outer periphery of the drum 11 in the lower region thereof.

In the apparatus shown and described hereinabove for carrying the image recording method according to the invention into practice, the demagnetizing head 7 exclusively for demagnetizing the magnetic recording member 1, 11 to remove the magnetic latent image therefrom is used. The demagnetizing head 7 can be dispensed with if the thermal fixing device 6, 16, 26 is constructed such that the magnetic recording layer 1B, 11B is heated by the fixing device to a temperature above its curie point to effect demagnetization of the magnetic recording layer.

Figure 9:
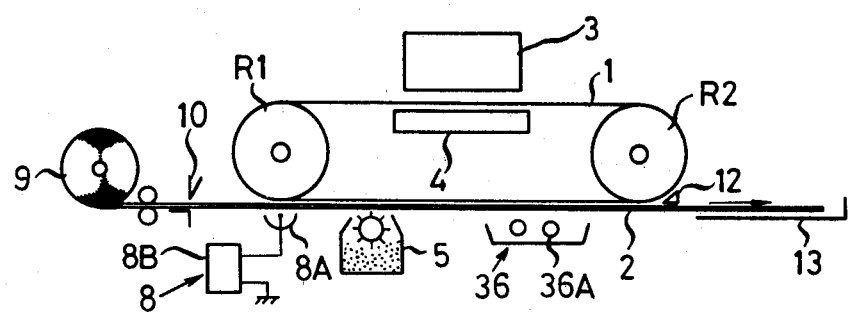
FIG. 9 is a schematic view of an apparatus suitable for carrying into practice a third embodiment of the invention in which demagnetization of the magnetic recording member can be carried out in the thermal fixing station.
Figure 10:
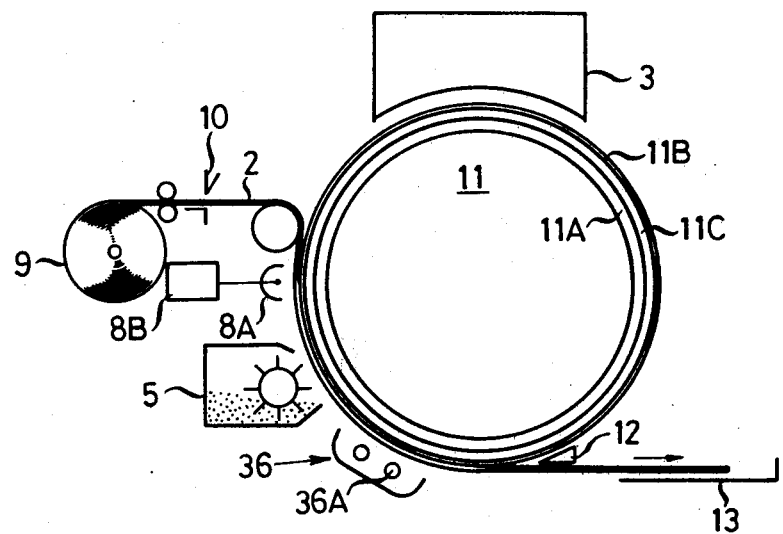
FIG. 10 is a schematic view of a modification of the apparatus shown in FIG. 9.

FIG. 9 shows an apparatus suitable for carrying into practice a third embodiment of the image recording method according to the invention, which are provided with a thermal fixing device 36 and FIG. 10 is a modification of the apparatus shown in FIG. 9. The apparatus shown in FIG. 9 uses a magnetic recording member 1 in the form of an endless belt, and the apparatus shown in FIG. 10 uses a magnetic recording member in the form of a drum. In FIG. 9, the magnetic recording belt 1 trained over the rollers R1 and R2 has an upper run which is a return run and a lower run which is a forward run. The nonmagnetic sheet 2 is brought into contact with the magnetic recording belt 1 at its lower forward run, and the contacting device 8, developing device 5 and thermal fixing device 36 are located along the lower run of the magnetic recording belt 1 with which the nonmagnetic sheet 2 is in contact. What characterizes the apparatus shown in FIGS. 9 and 10 is that no demagnetizing head is used and the thermal fixing device 36 serves concurrently as a demagnetizing device.

The thermal fixing device 36 may comprise an infrared ray lamp 36A serving as a heat source for carrying out infrared irradiation or a thermal roller including a silicone-rubber coated hollow metal tube having an infrared ray lamp mounted therein, which is rotated and pressed against the nonmagnetic recording sheet 2. The thermal fixing device 36 performs the function of obtaining thermal fixing of the magnetic toner image formed on the nonmagnetic recording sheet 2 by the developing device 5 and the function of demagnetizing the magnetic recording layer of the magnetic recording member 1, 11 to erase the magnetic latent image therefrom by heating the magnetic recording layer to a temperature above its curie point.

The curie points of various magnetic materials constituting the magnetic recording layer of the magnetic recording member 1, 11, are as follows: MnBi, 180° C.; MnAlGe, 175° C., $Y_3Gal_{1-1}Fe_{3-9}O_{12}$, 120° C.; $TbFeO_3$, 400° C.; and TbFe, 130° C.

Thus if the magnetic recording layer of the magnetic recording member 1 is formed of any one of the aforesaid magnetic materials, the demagnetizing temperature will be in the range between 100° and 400° C. depending on the material selected.

Meanwhile the fixing temperature of the dry magnetic toner is mainly decided by the synthetic resin constituting the toner and usually in the range between 100° and 300° C. By suitable selecting a synthetic resin to be mixed with the magnetic toner, it is possible to use a magnetic toner of a suitable fixing temperature that matches the demagnetizing temperature of the magnetic material.

Figure 11:
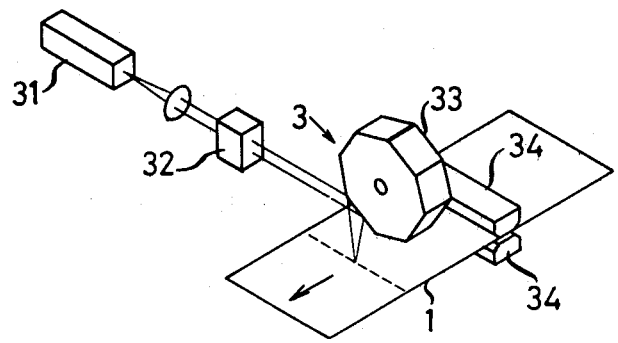
FIG. 11 is a schematic view of the magnetic recording station using a laser beam, of an apparatus suitable for carrying into practice a fourth embodiment of the method in conformity with the invention.

FIG. 11 shows a modification of the magnetic recording station 3 of the apparatus shown in FIG. 9, in which 31 is a laser oscillator which may be a solid-state laser, such as a ruby laser, or a gas laser using $CO_2$ or Ar. 32 is a modulator generally referred to as an acoustoptical element which is constructed to supply a signal to a CdS cell through a transducer. 33 is a rotary mirror including films of high reflectivity, such as of aluminum, applied to polygonal metal or glass surfaces. 34 is a magnetizing head or a magnetizer of the same construction as the magnetic core 3A shown in FIG. 2, or the magnetic head 34 may be composed of a permanent magnet.

Operation of the apparatus shown in FIGS. 9–11 will now be described. As the magnetic recording member 1, 11 is moved (rotated) by drive means, not shown, the magnetic sheet 1 passes between the magnetic core 3A and the magnetic shunt 4 in the case of the apparatus shown in FIG. 9. If a current is passed at this time to the magnetizing coil 3B of the magnetic core 3A, then a closed magnetic field is generated between the magnetic core 3A and the magnetic shunt 4 as indicated by dotted lines in FIG. 2, to thereby magnetize the magnetic recording layer of the magnetic recording member 1, 11. When no current is passed to the magnetizing coil 3B, no magnetic field is generated as indicated by the dotted lines in FIG. 2. That is, by effecting control of passing of an electric current to the magnetizing coil 3B in accordance with signals corresponding to the information desired to be recorded, it is possible to form a magnetic latent image of the information on the magnetic recording layer of the magnetic recording member 1, 11.

When the magnetic recording section 3 is constructed as shown in FIG. 11, the magnetic recording member 1 has its surface magnetized by the magnetizing head 34 and is scanned widthwise with a rotary mirror 33 with a laser beam emanating from a laser oscillator 31 which modulated by a modulator 32 actuated by signals corresponding to the information to be recorded. At the same time, the magnetic recording member 1 is moved to demagnetize the non-image regions of the information to be recorded thereon while the member 1 is moving. The portions of the magnetic recording member 1 irradiated with the laser beam are heated to a temperature higher than the curie point of the magnetic recording layer of the magnetic recording member 1 by the energy of the laser beam, to be demagnetized. Thus the portions of the magnetic recording member 1 not irradiated with the laser beam remain magnetized, to form a magnetic latent image on the magnetic recording member 1.

Then the nonmagnetic sheet 2 is brought into intimate contact with the magnetic recording member 1 which is supplied to the developing device 5 where the magnetic latent image is developed with a magnetic toner, and the toner image is fixed by the thermal fixing device 36 while the magnetic latent image is erased. The nonmagnetic recording sheet 2 with the developed and fixed toner image thereon is separated from the magnetic recording layer of the magnetic recording member 1. In repeat printing mode, however, the magnetic latent image formed on the magnetic recording layer of the magnetic recording member 1 is not erased and used again and again. In such a case, the fixing temperature of the thermal fixing device 36 is lowered to a level which is high enough to effect fixing of a toner image but low enough to avoid demagnetizing of the magnetic recording layer. For example, the infrared lamp 36A of the thermal fixing device 36 may be provided in a plurality of numbers and some of them may be rendered inoperative or to lower a voltage impressed thereon. This would enable the information to be recorded (printed) on a plurality of nonmagnetic sheets 2 continuously from the same latent image formed on the magnetic recording member 1.

In the apparatus shown in FIGS. 9-11, it is possible to simultaneously effect fixing of a toner image and erasing of a magnetic latent image, so that the apparatus can be simplified in construction and reduced in cost. The apparatus shown in FIGS. 9-11 operate in the same manner as described by referring to the apparatus shown in FIGS. 1-8 in that developing and fixing are carried out from above the nonmagnetic recording sheet 2 and thereafter the nonmagnetic sheet 2 is separated from the magnetic recording member 1. Thus it is possible to produce a printed image which is clear and will defined without contaminating the nonmagnetic sheet and the apparatus with a toner.

The use of a laser beam for forming a magnetic latent image in the method according to the invention will be described in some detail. In forming (writing) a magnetic latent image, difficulties are experienced in producing a magnetic head when the recording requires a resolution of over 10 LPS/mm when the magnetic head is required for carrying out recording. To avoid this problem, the recording method provided by the invention consists in reading out a document by means of a solid-state image sensor, modulating the output of a laser by the output of the image sensor, and scanning with the modulated laser beam the surface of a magnetic recording member having a magnetic material layer demagnetized by the action of a laser beam which is magnetized beforehand, to form a magnetic latent image corresponding to the information contained in the document.

The magnetic latent image is developed with a magnetic toner in such a manner that a nonmagnetic sheet, such as ordinary paper, is brought into intimate contact with the magnetic latent image on the magnetic recording member, and the toner image formed on the nonmagnetic sheet is fixed, if necessary, before the nonmagnetic sheet is separated from the magnetic recording member. This recording method enables high speed recording to be achieved by using a semiconductor laser of compact size and ordinary paper. Since no magnetic head is used, the apparatus is relatively simple in construction and low in cost. Because a laser beam is generated in conformity with the bright regions (background of information) of the document and no laser beam is generated in conformity with the dark regions (image regions of information) thereof, it is possible to form a magnetic latent image in positive-to-positive relation to the document. This is advantageous because the usual developing process used in electrophotography can be used and the process steps to be followed after developing can be simplified. Even if the magnetic layer formed with a magnetic latent image is not directly developed and the magnetic recording layer is repeatedly used, the cleaning step for cleaning the magnetic recording member to remove residual toner is done without, thereby simplifying the apparatus in construction.

Figure 12:
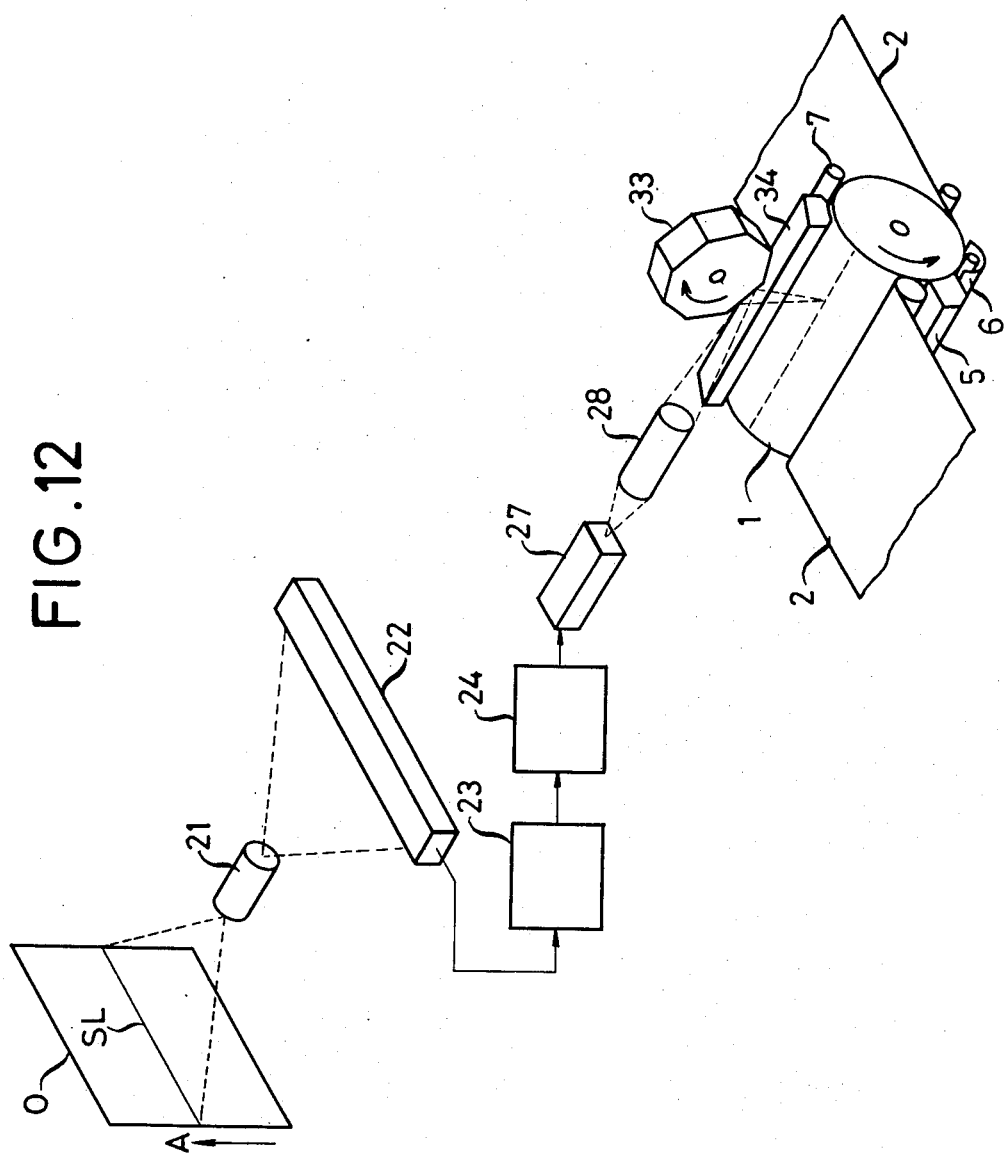
FIG. 12 is a schematic view of a modification of the apparatus shown in FIG. 11 in which a laser beam is used in the magnetic recording station.

In the recording apparatus shown in FIG. 12, a document O to be copied is conveyed in the direction of an arrow A parallel to the surface of the document O on which a slit-like zone SL of a very narrow width is illuminated by illuminating means, not shown. The light image reflected by slit-like zone SL on the surface of the document O is focused on light receiving segments of a solid-state image sensor 22 light receiving surface of which is parallel to the slit-like zone SL on the document O, to form a reduced image of the slit-like zone SL thereon. The solid-state image sensor 22 converts the light intensity on each light-receiving segment into a series of electric signals of time series. Actually the length of the solid-state image sensor 22 is smaller than the width of the document O. A charge coupled device or a photodiode array may be used as the solid-state image sensor 22. As the document O is moved in the direction of the arrow A, the surface of the document O is swept by the slit-like zone SL which is fixed in the space, while the surface of the document O is scanned and read by the solid-state image sensor 22. In scanning the document O with the image sensor 22, optic fiber bundles and other means may be used besides the illustrated image forming optical system.

The electric signals of the time series corresponding to the document O generated by the image sensor 22 or video signals are transmitted to a buffer memory 23 to be stored therein and supplied therefrom when necessary. The video signals from the buffer memory 23 are amplified by an amplifier 24 as current signals which are supplied to a semiconductor laser 27. The output of the image sensor 22 may, of course, be supplied directly to the semiconductor laser 27 which is being activated by a DC current of a value in the vicinity of its threshold value so that the video image signal currents amplified by the amplifier 24 can be superposed on the DC current.

When a double hetero diode or DH diode laser of the GaAs-SeAlAs base is used as the semiconductor laser 27, this DH diode laser offers advantages in that it is highly reliable in performance and it has a prolonged service life. It generates a laser beam of a wavelength of 0.8-0.9 nm. Although an ordinary laser of the known type may be used in place of the semiconductor laser 27, a modulator element utilizing electrooptical or acoustooptical effects has to be used for modulating a laser beam. When a semiconductor laser of the infusion type referred to hereinabove is used, however, modulation can be effected by supplying the image signals directly to the laser element as infused currents, so that the use of the modulator element can be eliminated. This is conductive to simplification of the recording apparatus.

The laser beam emitted intermittently from the semiconductor laser 27 in accordance with the image signals is converged by a converging optical system 28 to be incident on one spot. A rotatable polyhedron mirror 33 has its mirror surfaces (reflecting surfaces) inserted in the optical path of the converging beam, so that the point at which the converging laser beam is incident is located on the surface of the magnetic recording member 1. As the rotary polyhedron mirror 33 is rotated at a predetermined angular velocity, the converging point cyclically moves on the surface of the magnetic recording member 1. Thus the angular velocity of the polyhedron mirror 33 has only to be selected in such a manner that the distance covered by the movement of the converging point in one cycle of movement of one mirror surface corresponds to the length (width of the document O) of the slit-like zone SL on the surface of the document O. In order to keep constant the density of the energy of the converging laser beam on the magnetic recording member 1, the surface of the magnetic recording member 1 may have a certain curvature directed in a direction at a right angle to the circumference of its rotation, to render the center of curvature to coincide with the center of deflection of the converging laser beam by the polyhedron mirror 33. Also, in place of using the polyhedron mirror 33, a deflecting element may be used to carry out self-scanning by means of a laser beam.

As the image signals are supplied from the buffer memory 23 and the magnetic recording member 1 is rotated in the direction of an arrow in synchronism with the rotation of the polyhedron mirror 33, images of the document O are successively illuminated on the surface of the magnetic recording member 1 by the spots of the converging laser beam. The magnetic recording member 11 has a magnetic recording layer which is demagnetized by the action of the laser beam, and its surface is perpendicularly magnetized beforehand by a magnetizer 34 disposed in spaced-juxtaposed relation to the surface of the magnetic recording member 11. Thus only the portions of the magnetic recording member 11 (corresponding to the background zone of the document O) on which the spots of the converging laser beam impinge are demagnetized, and the portions of the magnetic recording member 11 (corresponding to the image zones of the document O) on which no spots of the converging laser beam impinge remain magnetized. Therefore, a magnetic latent image in positive-to-positive relation to the image of the document O is formed on the surface of the magnetic recording member 11.

It is believed that the aforesaid demagnetizing phenomenon stems from the fact that the magnetic material layer of the magnetic recording member 1 is thermally excited by the energy of the spots of the converging laser beam and the thermally excited spots show a temporary rise in temperature to a level above the curie point of the magnetic material layer. The output of the semiconductor laser referred to hereinabove is about 10 mW. However, if the spots had a diameter of about 10 $\mu$m and the modulating frequency used were 100 KHz, the energy density of one dot would be on the order of $10^5$ erg/cm$^2$. Thus the energy density would be sufficiently high to effect demagnetization by using a curie point.

The magnetic latent image formed on the surface of the magnetic recording member 11 is superposed on a nonmagnetic sheet 2, such as ordinary paper, which is fed in synchronism with the movement of the magnetic recording member 11, and a magnetic toner is supplied to the back of the sheet 2 from the developing device 5, to form on the sheet 2 a toner image corresponding to the image of the document O. After the toner image is fixed by the fixing device 6 (when a dry developing process is used), the nonmagnetic recording sheet 2 is separated from the magnetic recording member 1. As the magnetic toner, magnetic powder of $CrO_2$, $Fe_2O_3$, $Fe_3O_4$, etc., of preferably 0.1–10 $\mu$m in particle size may be used which is mixed with resin powder, such as acrylic resin, vinyl resin, etc., and kneaded by using toluene, MEK, ethyl acetate or other suitable solvent, before being subjected to centrifugal drying to produce powder or before being dried and crushed into powder form. When the magnetic toner in powder form referred to hereinabove is used, any known developing process, such as a magnet-brush process, cascade process, powder-cloud process and other dry developing process, may be used. When a liquid developing process is used, an immersion process, roll process, mist process, etc., may be used. The liquid developing agent used may be made by mixing the aforesaid magnetic powder with gelatin, acrylic resin or polyvinyl alcohol resin in powder form and kneading the mixture after one of the aforesaid solvents is added thereto, before the mixture is dispersed in a paraffin base hydrocarbon, alcohol, water or other liquid. Following separating of the nonmagnetic sheet 2 from the surface of the magnetic recording member 11, the surface of the magnetic recording member 11 is heated to its curie point by means of a demagnetizer 7 including an infrared lamp, for example, to demagnetize the rest of the magnetized regions. This finished one cycle of copying operation.

From the foregoing description, it will be appreciated that the recording method provided by the invention offers many advantages because it enables high speed recording to be effected and a semiconductor laser of compact size and ordinary paper can be used in carrying the recording method into practice. The use of no magnetic head facilitates fabrication of the apparatus and reduces cost. Particularly the arrangement whereby the laser is actuated in conformity with the bright regions (background) of the document O and the laser is not actuated in conformity with the dark regions (image regions) of the document O enables the magnetic latent image to be formed in positive-to-positive relation to the document. Thus it is possible to use an ordinary developing process used in electrophotography, thereby making it easy to follow the subsequent process steps. Since the magnetic material layer formed with a magnetic latent image is not directly developed, no cleaning of the magnetic recording member is required even when the magnetic material layer is repeatedly used. This is conductive to simplification of the apparatus in construction.

While the invention has been described by referring to various apparatus suitable for carrying the method of recording into practice, it is to be understood that many modifications and changes may be made therein and that any and all the changes and modifications within the scope of the invention as claimed in the claims shall be covered by the invention.

What is claimed is:

1. An image recording method comprising the steps of:
    superposing a nonmagnetic sheet over a magnetic recording member;
    forming a magnetic latent image on the magnetic recording member before or after the nonmagnetic sheet is superposed over the magnetic recording member by using perpendicular magnetization heads located close to said magnetic recording member either directly or through the nonmagnetic sheet to supply thereto magnetic field signals corresponding to the information to be recorded;
    developing the magnetic latent image with a magnetic toner from above the nonmagnetic sheet superposed over the magnetic recording member, to produce a toner image on the nonmagnetic sheet;
    fixing the toner image on the nonmagnetic sheet superposed on the magnetic recording member by the application of heat; and
    separating the nonmagnetic sheet from the magnetic recording member following the fixing step.

2. An image recording method as claimed in claim 1, further comprising the step of erasing the magnetic latent image on the magnetic recording member by demagnetization in normal operation.

3. A recording method as claimed in claim 1, wherein the magnetic latent image on the magnetic recording member is erased at a temperature in the fixing step at which the toner image is thermally fixed.

4. A recording method as claimed in claim 3, wherein, when a plurality of duplicates are recorded from the same magnetic latent image, a temperature at which the toner image is thermally fixed and the magnetic latent image on the magnetic recording member can be erased is generated only when the last of the plurality of duplicates is recorded.

5. A recording method as claimed in claim 1, wherein the surface of the magnetic recording member is uniformly magnetized beforehand and demagnetized by the action of a laser beam in conformity with the image of a document to be recorded, in the magnetic latent image forming step.

6. A image recording method as claimed in claim 1, wherein the magnetic latent image on the magnetic recording member is not erased after the separating step, thereby enabling to continuously print the information on a plurality of nonmagnetic sheets.

7. A recording method as claimed in claim 6, wherein, when a plurality of duplicates are recorded from the same magnetic latent image, a temperature at which the toner image is thermally fixed and the magnetic latent image on the magnetic recording member can be erased is generated only when the last of the plurality of duplicates is recorded.

8. A recording method as claimed in claim 1, including bringing the nonmagnetic sheet into intimate contact with the magnetic recording member by applying an electrostatic charge to said nonmagnetic sheet.

9. A recording method as claimed in claim 8, including electrically grounding said recording member.

10. A recording method as claimed in claim 1, said magnetic magnetization heads being placed on one side of said recording member and a magnetic shunt being placed on the other side thereof in a position opposed to said magnetization heads, the side of said shunt closes to said recording member having a nonmagnetic surface layer.

11. An image recording apparatus comprising:
means for superposing a nonmagnetic sheet over a magnetic recording member;
means including perpendicular magnetization heads located close to said magnetic recording member for forming a magnetic latent image on the magnetic recording member before or after the nonmagnetic sheet is superposed over the magnetic recording member either directly or through the nonmagnetic sheet to supply thereto magnetic field signals corresponding to the information to be recorded;
means for developing the magnetic latent image with a magnetic toner from above the nonmagnetic sheet superposed over the magnetic recording member, to produce a toner image on the nonmagnetic sheet;
means for fixing the toner image on the nonmagnetic sheet superposed on the magnetic recording member by application of heat; and
means for separating the nonmagnetic sheet from the magnetic recording member following the fixing step.

12. An image recording apparatus as claimed in claim 11, further comprising means for erasing the magnetic latent image on the magnetic recording member by demagnetization in normal operation.

13. A recording apparatus claimed in claim 1, including means for erasing the magnetic latent image on the magnetic recording member by heat applied at a temperature at which the toner image is thermally fixed in the fixing step.

14. A recording apparatus as claimed in claim 13, wherein, when a plurality of duplicates are recorded from the same magnetic latent image, a temperature at which the toner image is thermally fixed and the magnetic latent image on the magnetic recording member can be erased is generated when the last of the plurality of duplicates is recorded.

15. A recording apparatus as claimed in claim 11, the surface of the magnetic recording member is uniformally magnetized beforehand and demagnetized by the action of a laser beam in conformity with the image of a document to be recorded, in the magnetic latent image forming step.

16. A recording apparatus as claimed in claim 11, wherein the magnetic latent image on the magnetic recording member is not erased after the separating step, thereby enabling to continously print the information on a plurality of nonmagnetic sheets.

17. A recording apparatus as claimed in claim 16, wherein, when a plurality of duplicates are recorded from the same magnetic latent image, a temperature at which the toner image is thermally fixed and the magnetic latent image on the magnetic recording member can be erased is generated only when the last of the plurality of duplicates is recorded.

18. A recording apparatus as claimed in claim 11, including means for bringing the nonmagnetic sheet into intimate contact with the magnetic recording member by applying an electrostatic charge to said nonmagnetic sheet.

19. A recording apparatus as claimed in claim 18, including means for electrically grounding said recording member.

20. A recording method as claimed in claim 11, said magnetic magnetization heads being placed on one side of said recording member and a magnetic shunt being placed on the other side thereof in a position opposed to said magnetization heads, the side of said shunt closes to said recording member having a nonmagnetic surface layer.

* * * * *